United States Patent [19]

Nakashima

[11] 4,158,991
[45] Jun. 26, 1979

[54] AUTOMATIC BARBEQUING DEVICE

[76] Inventor: Toshiyuki Nakashima, 8-50, Yanagouchi 1-chome, Minami-ku, Fukuoka-shi, Japan

[21] Appl. No.: 858,056

[22] Filed: Dec. 6, 1977

[30] Foreign Application Priority Data

Jun. 11, 1977 [JP] Japan ............................. 52/76369[U]

[51] Int. Cl.² ............................................. A47J 37/04
[52] U.S. Cl. ................................. 99/421 H; 403/223
[58] Field of Search ................. 99/419, 421 R, 421 H, 99/421 V, 421 HH, 421 P; 403/223, 301, 302, 354, 373, 378; 64/2 R, 6, 11 F, 32 F

[56] References Cited

U.S. PATENT DOCUMENTS 2,399,163  4/1946  Brunamonti .................... 99/421 HH
3,866,527  2/1975  Katric ............................... 99/421 H

*Primary Examiner*—George F. Mautz
*Attorney, Agent, or Firm*—Frank J. Jordan

[57] ABSTRACT

A barbequing device which can barbeque any kind of meat or vegetables automatically is disclosed.

The barbequing device is substantially characterized by a combination of a skewer holding plate and a pair of skewer receiving grooves formed in the longitudinal side walls of a skewer mounting frame.

Due to the cooperative operation of the above combination, a skewer which pierces meats and vegetables is held firmly by a skewer rotating shaft and is rotated firmly and stably, whereby such meats and vegetables are evenly barbequed.

6 Claims, 9 Drawing Figures

AUTOMATIC BARBEQUING DEVICE

BACKGROUND OF THE INVENTION

This invention relates to an automatic barbequing device having a skewer which automatically rotates above a heat source, such as a burner, so that meats and vegetables can be evenly roasted or broiled.

Conventionally, in barbequing, a plurality of skewers, each of which pierces a desired number of meat or vegetable pieces, are extended over a heat source, such as burners or burning charcoal, both ends are held in place by the side walls of a skewer mounting frame. Recently, various kinds of automatic barbequing devices have been developed for increasing barbequing efficiency. The mechanism for rotating skewers is especially a remarkable improvement.

However, since a skewer, in general, has a cross-section of either a circle or a flat rectangular shape, it has been extremely difficult to rotate skewers smoothly by such automatic devices.

Particularly, no mechanisms which can rotate such skewers have been sufficient in their operations.

Furthermore, since no effective covering means is provided in such a barbequing device, when the sauce coated on the meat scatters, the barbequing place becomes dirty and messy resulting in frequent checkings or cleaning of the skewer rotating mechanism or skewer drive frame.

Accordingly, it is an object of the present invention to provide an automatic barbequeing device which can resolve the afore-mentioned problems.

It is another object of the present invention to provide an automatic barbequing device having a skewer rotating mechanism which can firmly grasp and rotate the skewer.

It is still another object of the present invention to provide an automatic barbequing device having a covering means which facilitates the easy and rapid cleaning and checking of the skewer rotating mechanism.

The construction of the automatic barbequing device of this invention is hereinafter disclosed in conjunction with the attached drawings.

DETAILED DESCRIPTION OF THE DISCLOSURE

Figure 6:
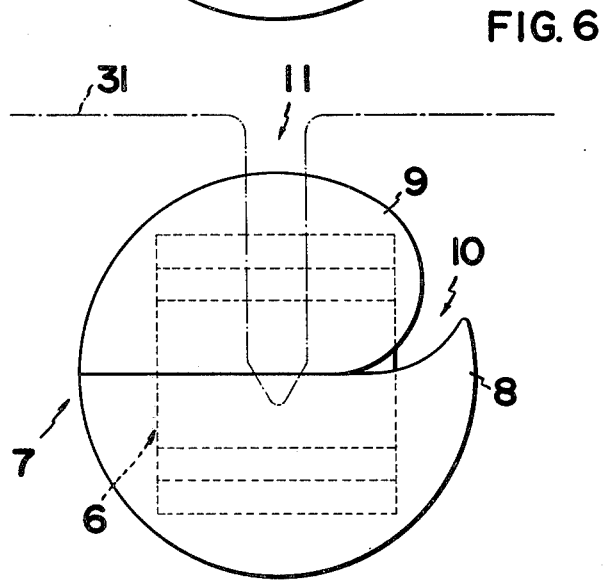
FIG. 6 to FIG. 9 are explanatory views showing the operation of the skewer clamping mechanism.

In the drawings, a rectangular shaped skewer mounting frame 2 which encloses a desired heat source 1, such as a burner or burning charcoal, is disposed parallely to and adjacently to a skewer drive frame 3 which encases a skewer drive mechanism therein. The skewer drive frame 3 also accommodates a plurality of parallely spaced-apart rotating shafts 5 which are driven by the skewer rotating mechanism 4. A U-shaped resilient plate 6 is fixedly secured to one end of each rotating shaft 5 which is located adjacently to the inner side wall of the skewer mounting frame 2. Such resilient plate 6 consists of a base portion 6a bolted to one end of the rotating shaft 5 and two spaced apart leg portions 6b which are generally disposed perpendicular to the base portion 6a and are biased such that their free ends come closer to each other. A pair of semi-circular plates 8,9 which jointly form a skewer clamping circular plate 7 are secured to the leg portion 6-b of each U-shaped resilient piece 6. Due to such construction, the abutting surfaces 8a 9a of the semi-circular plates 8,9 are biasingly come into contact with each other due to the elasticity of the resilient plate 6. These two semi-circular plates 8 and 9 have their abutting peripheries cut into as shown in FIG. 6 providing a curved fan-shaped skewer introducing path 10 in the skewer clamping circular plate 7. This fan-shaped skewer introducing path 10 has the width gradually narrowed toward the center of a skewer clamping circular plate 7 such that when a skewer 35 reaches the center, the skewer 35 can be biasingly clamped-by the abutting peripheries 8a, 9a of the circular plate. A pair of skewer receiving grooves 11 and 12 are formed in the longitudinal side walls of the skewer mounting frame 2 such that both grooves 11 and 12 lie coaxially on the extension line of the rotating shaft 5.

A safety cover means which can, when closed, completely cover the skewer drive frame 3 has a lower corner portion pivotally mounted on the corresponding lower end walls of the skewer drive frame 3.

It is preferable that the skewer clamping circular plate 7 has only one fan-shaped skewer introducing path 10.

When the meat or vegetable pieces which are coated with flavoring sauces are roasted, the sauces tend to drop downward. In order to prevent this, the skewer 35 must be rotated at a constant speed. Such speed, according to the experiment conducted by the inventor, is about 60 revolutions per minute. Namely, it is desirable that the skewer clamping plate 7 resiliently clamp only one skewer per revolution. Otherwise, for example, if the skewer holding clamping plate 7 would be constructed such that two skewers 35 could be held during a revolution, the skewers 35 would be insufficiently held and rotated by the rotating shaft 5.

Figure 1:
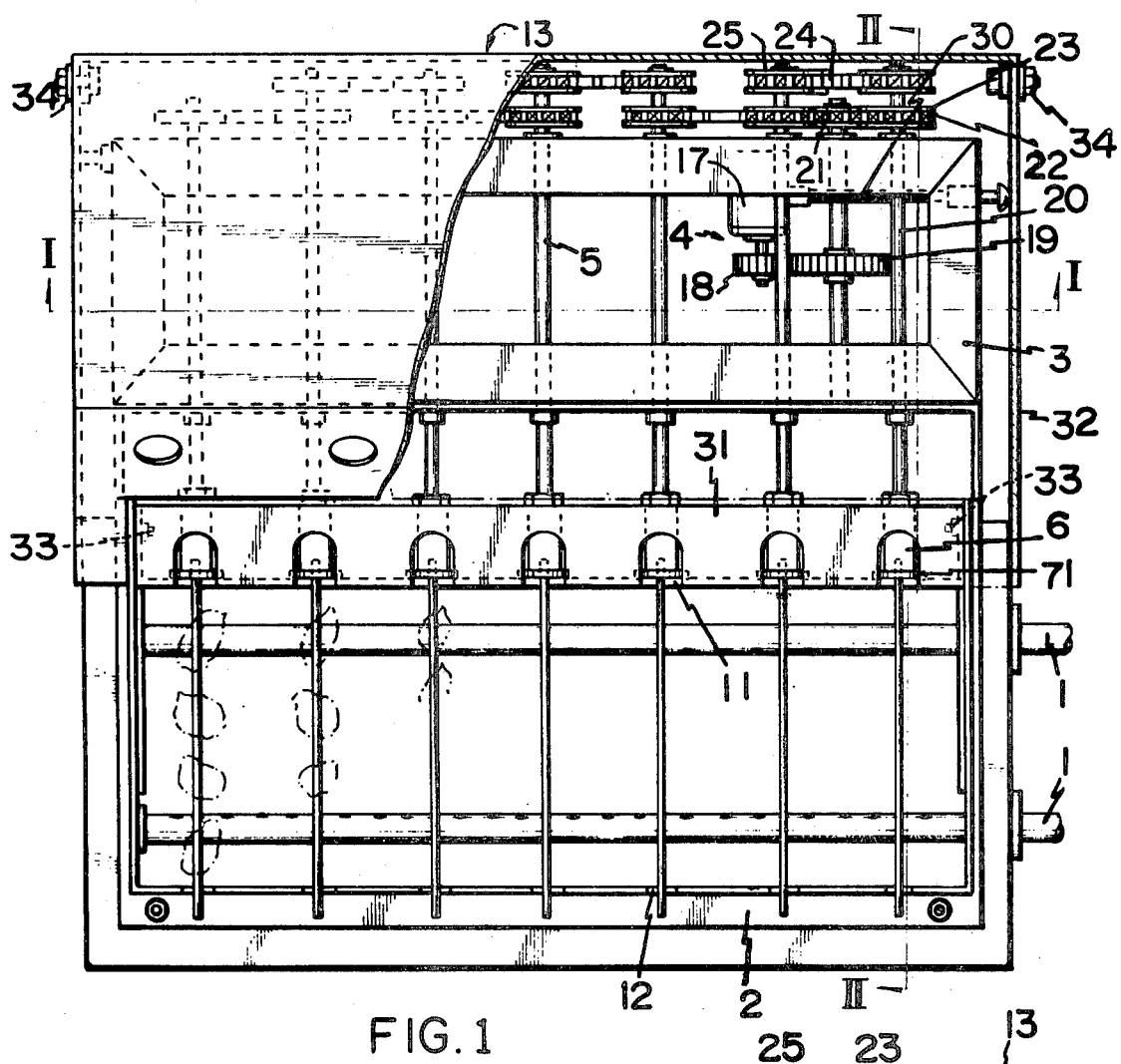
FIG. 1 is a plan view with a part broken away of the automatic barbequing device of the present invention.
Figure 2:
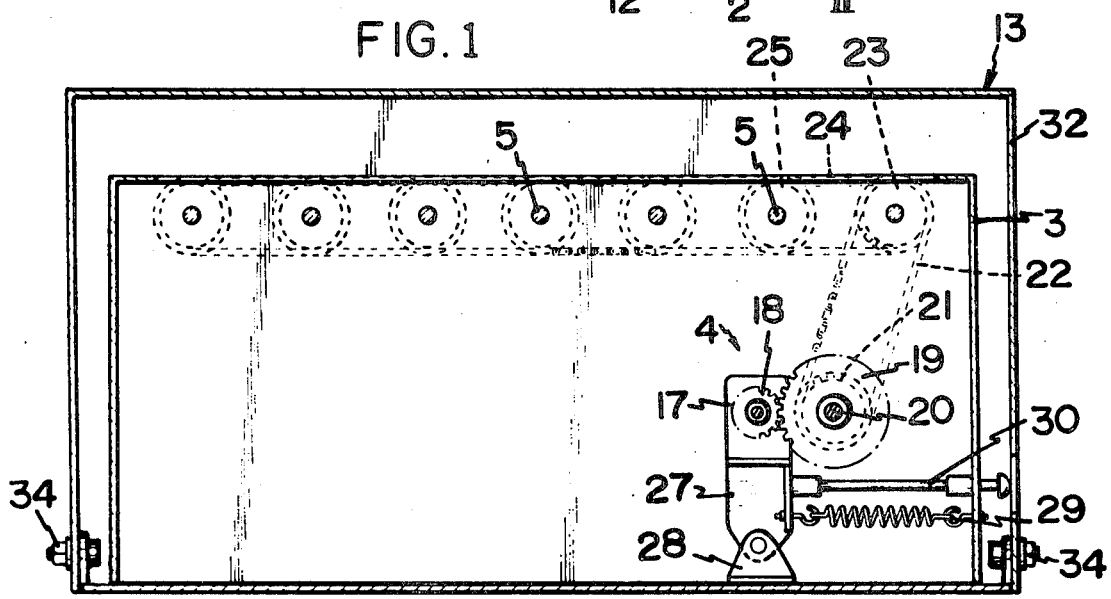
FIG. 2 is a cross-sectional front view of the device taken along the line I—I of FIG. 1.
Figure 3:
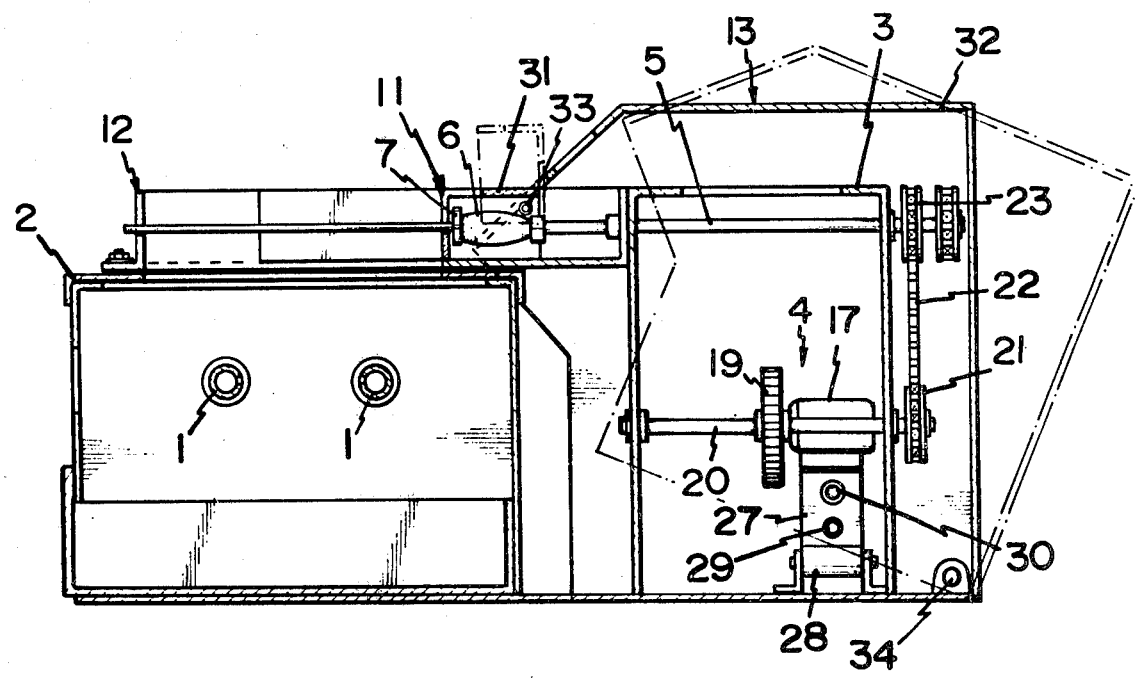
FIG. 3 is a cross-sectional view of the device taken along the line II—II of FIG. 1.
Figure 4:
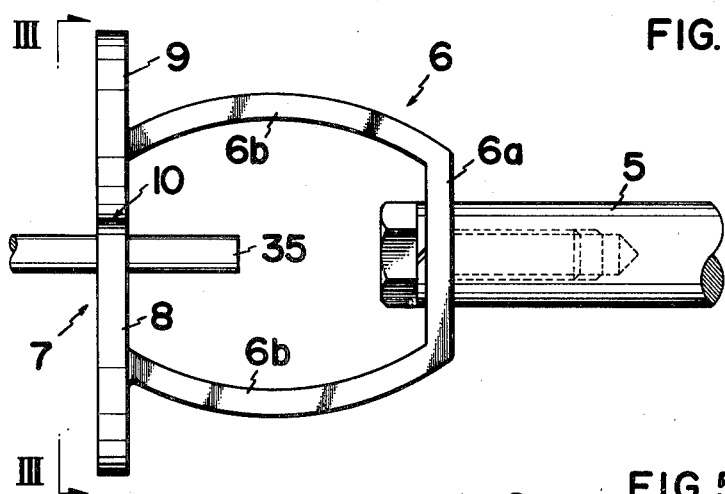
FIG. 4 is an enlarged explanatory view of a skewer clamping mechanism employed in the device of this invention.
Figure 5:
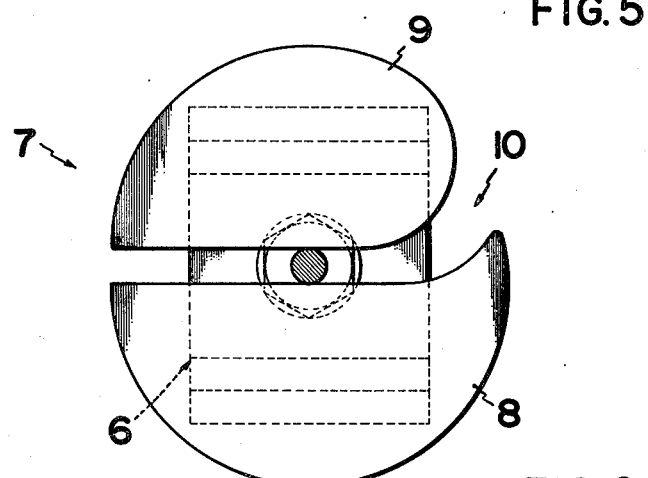
FIG. 5 is a front view of the skewer clamping mechanism taken along the line III—III of FIG. 4.

The detailed construction of the skewer rotating mechanism 4 is shown in FIG. 1 through FIG. 3.

A power-operated motor 17 with a speed reduction device is disposed in the skewer drive frame 3. A small rubber roller 18 is secured to the output shaft of the motor. This small roller 18 biasingly comes into contact with a large rubber roller 19 such that the rotation of the small roller 18 causes the corresponding rotations of the large roller 19 due to the friction therebetween.

A first power transmission shaft 20 which has both ends rotatably supported by the longitudinal side walls of the skewer drive frame 3 carries the above large roller 19 at the middle portion thereof. This first power transmission shaft 10 further carries a sprocket wheel 21 at the extension thereof. This sprocket wheel 21 is connected with a sprocket wheel 23 by means of a first transmission chain 22, which, in turn, is fixedly secured to the extension of the rotating shaft 5.

A second transmission chain 24 is extended between two other sprocket wheels 25, each of which is fixedly secured to the remaining rotating shaft 5. Due to the above construction, the driving power imparted to the first sprocket wheel 23 is continuously transferred to all the remaining sprocket wheels 25.

For adjustably supporting the power-operated motor 17, a motor support mechanism is provided. The mechanism comprises a motor mounting base 27, a support bracket 28 which pivotally supports the motor mounting base 27, a tension spring which constantly pulls the motor mounting base 27 in a direction toward one end wall of the skewer drive frame 3 so as to bring two rollers 18 and 19 into the biasing relationship and a stopper mechanism 30 which can break the above relationship at any desired time and duration. Due to the above construction, the instant stopping of the rotation of the rotating shaft 5 which is frequently done throughout the barbequing operation is conducted without cutting the power supply to the power-operated motor 17.

Referring now to the construction of the safety cover means 13, the cover 13 consists of an elastic plate safety cover 31 which covers all the resilient plates 6 and a drive-frame safety cover 32 which covers the entire construction of the skewer drive frame 3. These covers 31 and 32 are pivotable as shown by the dotted lines on their respective pivot shafts 33 and 34. Futhermore, the one side wall of the elastic-plate safety covers 31 can be provided with a row of skewer receiving grooves 11. Due to the above construction, when the checking or cleaning of the rotating mechanism 4 is required, the safety cover 13 can be opened as a whole while the checking or cleaning of the U-shaped resilient plates is accomplished. Mere rotation of the safety cover 31 can provide an opening sufficient to conduct such an operation.

The manner in which the device of this invention is operated is hereinafter disclosed in conjunction with attached drawings especially FIG. 6 to FIG. 9.

The heat source 1 such as a gas burner or charcoals disposed in the skewer mounting frame 2 is fired. All of the rotating shafts 5 are driven simultaneously with the actuation of the rotating mechanism 4. Accordingly, the resilient plates 6 and the skewer clamping plate 7 (semicircular plates 8 and 9) secured to the resilient plates 6 are rotated together with rotating shafts 5.

Figure 7:
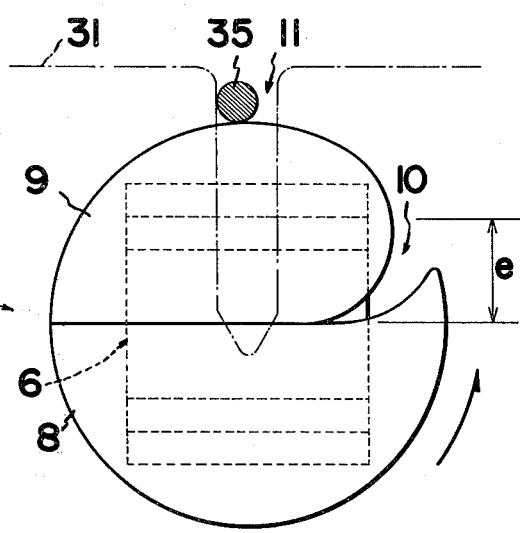
Figure 8:
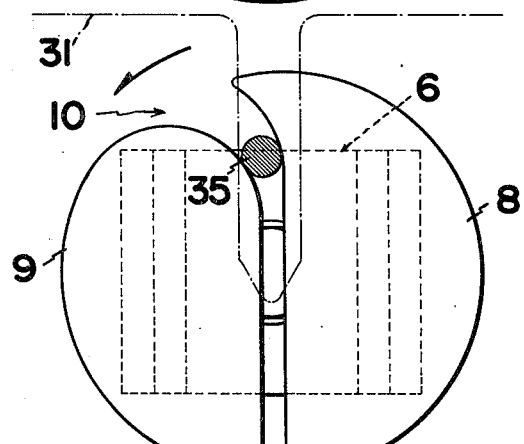
Figure 9:
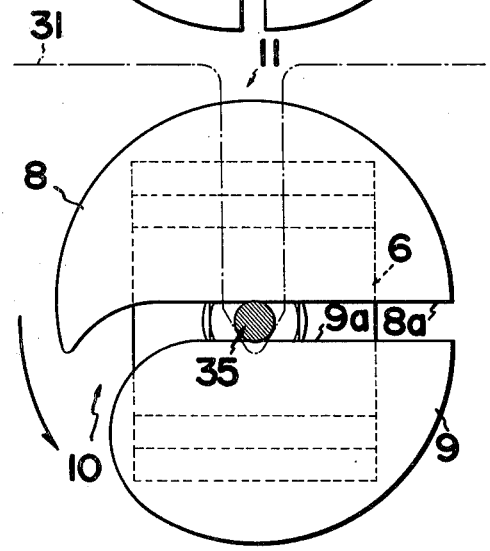

Subsequently, the skewer 35 which pierces meat or vegetable is mounted on the frame 2 such that the both ends thereof rest in the skewer receiving grooves 11 and 12. Simultaneously, the extremity of the above skewer 35 is placed on the circular periphery of the skewer clamping circular plate 7 which is rotating together with the rotating axis 5 as shown in FIG. 7. Accordingly, with the rotation of the circular plate 7, the extremity of the skewer 35 falls along the periphery of the circular plate 7 into the fan-shaped introducing path 10 due to the weight of the skewer 35 and the weight of the meat and vegetables pierced by the skewer 35.

Since (1) the fallen position of the skewer 35 is eccentric (e) relative to the rotating axis of the skewer clamping plate 7, (2) the corresponding peripheries of the semi-circular plates 8 and 9 are constructed such that they can biasingly clamp the skewer 35 therebetween due to the elasticity of the resilient plate 6 and (3) the rotation of the skewer 35 along with the rotation of the skewer clamping plate 7 is restricted by the skewer receiving grooves 11 and 12; the skewer 35 moves toward the rotating axis of the skewer clamping plate 7 against the elastic force of the U-shaped resilient plate 6 and reaches the rotating axis (center) of the skewer clamping plate 7. At this position, the rotating force of the rotating shaft 5 is directly and fully imparted to the skewer 35 so that the skewer 35 starts the stable and constant rotation thereof. With such rotation of the skewer 35, the meat or vegetable pieces pierced by the skewer 35 have their entire surface evenly roasted by the heat source 1. When the meat and vegetables are completely roasted or barbequed, either end of the skewer 35 is given a lifting force manually or automatically. Due to this lifting force, the skewer 35 escapes upward from the fan-shaped skewer introducing path 10 along the desired periphery of the semi-circular plate 8 or 9.

Accordingly, the automatic barbequing device of this invention has the following advantages.

(1) By merely placing one end of the skewer 35 into the skewer receiving grooves 11,12, the skewer 35 is firmly pinched or held by the circular clamping plate 7 and rotates together with the plate 7. Furthermore since the circular clamping plate 7 is provided with one fan-shaped skewer introducing path 10, one skewer 35 can be held during a revolution.

(2) The skewer clamping plates 7 and U shaped resilient plates 6 often may get dirty and messy. Since the safety cover of this invention comprises the cover 32 for the skewer drive frame and the cover 31 for the U-shaped resilient plates 6, the cleaning or checking of the resilient plates 6 can be done by merely pivotally opening the cover 31 independently from the operation to open the cover 32 for the skewer drive frame 3.

(3) By pushing forward the stopper mechanism, the biasing engagement between the small and large rollers 18,19 is readily severed so that the rotation of the skewer 35 can be readily stopped without necessitating the cutting of the power supply to the power-operated motor 17.

What we claim is:

1. An automatic barbequing device for automatically broiling or roasting meats and/or vegetables comprising:
    (a) a skewer mounting frame which has a skewer receiving portion at the upper end thereof and encases a heat source such as a burner therein, said skewer mounting frame having side walls,
    (b) a skewer drive frame disposed parallel to and adjacent to said skewer mounting frame and which encases a skewer rotating mechanism therein,
    (c) a plurality of rotating shafts disposed in said skewer drive frame in a parallel-spaced-apart relationship, said rotating shafts all being rotated by said skewer rotating mechanism,
    (d) U-shaped resilient plates each of which is secured to one end of each of said rotating shafts, said ends being disposed adjacent to one side wall of said skewer mounting frame,
    (e) skewer clamping plate means on each of said U-shaped resilient plates, each of said clamping plate means comprising a pair of semi-circular plates each having straight peripheral portions which resiliently abut each other, said pair of semi-circular plates having their corresponding sides secured to the free ends of said U-shaped resilient plate for biasingly abutting said straight peripheral portions due to the elastic force of said U-shaped resilient plate, and
    (f) a plurality of skewer receiving grooves formed in two of said side walls of said skewer mounting frame, said grooves being in alignment with the rotating axis of said rotating shafts.

2. An automatic barbequing device according to claim 1 wherein said skewer drive frame includes a cover means which pivotally covers said skewer drive frame.

3. An automatic barbequing device according to claim 1 wherein said skewer drive frame includes a cover means which pivotally covers said U-shaped resilient plates and said skewer clamping plate means.

4. An automatic barbequing device according to claim 1 wherein said skewer rotating mechanism comprises:
 (a) a main drive shaft disposed below said plurality of skewer drive shafts for transmitting a rotating force to said skewer drive shafts,
 (b) a large rubber wheel secured to the middle portion of said main drive shafts,
 (c) a small rubber wheel biasingly engaged with said large rubber wheel, said small rubber wheel being secured to the output shaft of a power-operated motor,
 (d) a base mounting said motor, said base being pivotally mounted on a base of said skewer drive frame, and
 (e) a stopper means for temporarily interrupting the biasing engagement of said small and large rubber wheels.

5. An automatic barbequing device according to claim 4 wherein said stopper means comprises:
 (a) a tension spring having one end secured to said motor base and another end secured to an end wall of said skewer drive frame for biasingly bringing said small rubber wheel into contact with said large rubber wheel, and
 (b) a horizontal push bar having one end secured to said motor base and another end slidably extended through said end wall of said skewer frame.

6. An automatic barbequing device according to claim 4 wherein a fan-shaped skewer introducing path is formed in said skewer clamping plate means.

* * * * *